(12) United States Patent
Tanioka

(10) Patent No.: US 9,068,493 B2
(45) Date of Patent: Jun. 30, 2015

(54) EXHAUST GAS PURIFICATION SYSTEM ABNORMALITY DIAGNOSING DEVICE AND ABNORMALITY DIAGNOSING METHOD, AND EXHAUST GAS PURIFICATION SYSTEM

(75) Inventor: Kenichi Tanioka, Saitama (JP)

(73) Assignee: Bosch Corporation, Tokyo (JP)

( * ) Notice: Subject to any disclaimer, the term of this patent is extended or adjusted under 35 U.S.C. 154(b) by 1090 days.

(21) Appl. No.: 13/080,233

(22) Filed: Apr. 5, 2011

(65) Prior Publication Data

US 2011/0239628 A1 Oct. 6, 2011

(30) Foreign Application Priority Data

Apr. 5, 2010 (JP) .................................. 2010-87159

(51) Int. Cl.
*F01N 3/20* (2006.01)
*F01N 11/00* (2006.01)

(52) U.S. Cl.
CPC .............. *F01N 3/208* (2013.01); *F01N 11/002* (2013.01); *F01N 2550/00* (2013.01); *F01N 2560/026* (2013.01); *F01N 2610/02* (2013.01); *Y02T 10/47* (2013.01); *Y02T 10/24* (2013.01)

(58) Field of Classification Search
CPC ... F01N 3/208; F01N 11/002; F01N 2250/00; F01N 2250/02; F01N 2250/05; F01N 2550/20; F01N 2560/026; F01N 2610/02; Y02T 10/24; Y02T 10/47
USPC .............................. 60/277, 295, 301, 303, 324
See application file for complete search history.

(56) References Cited

U.S. PATENT DOCUMENTS 7,854,161 B2 12/2010 Hjorsberg et al.
2002/0144502 A1 10/2002 Beer et al.
2003/0089101 A1 5/2003 Tanaka et al.
2010/0024394 A1 2/2010 Kitazawa

FOREIGN PATENT DOCUMENTS

| EP | 1225323 | | 7/2002 |
| JP | 11029149 | | 2/1999 |
| JP | 2003293743 | A | 10/2003 |
| JP | 2008157136 | A | 7/2008 |
| JP | 4324790 | B2 * | 9/2009 |

OTHER PUBLICATIONS

English language machine translation of JP432790B2, accessed May 15, 2014.*

* cited by examiner

*Primary Examiner* — Kenneth Bomberg
*Assistant Examiner* — Jonathan Matthias
(74) *Attorney, Agent, or Firm* — Michael Best & Friedrich LLP

(57) ABSTRACT

An exhaust gas purification system abnormality diagnosing device includes: a sensor value detecting means that reads a sensor signal of a specified gas concentration sensor to detect a gas concentration; a limiting device controlling means which, when the gas concentration has become equal to or greater than a predetermined start-of-diagnosis threshold value or when a difference obtained by subtracting from the gas concentration an estimated $NO_x$ concentration on a downstream side of a selective reduction catalyst obtained by computation has become equal to or greater than a predetermined start-of-diagnosis threshold value, increases the quantity of ammonia capable of being adsorbed by the selective reduction catalyst by raising the pressure inside an exhaust gas passageway with a passageway area limiting device disposed on the downstream side of the selective reduction catalyst; and a determining means that determines the abnormal state on the basis of the gas concentration or the difference after the pressure inside the exhaust gas passageway has been raised.

8 Claims, 13 Drawing Sheets

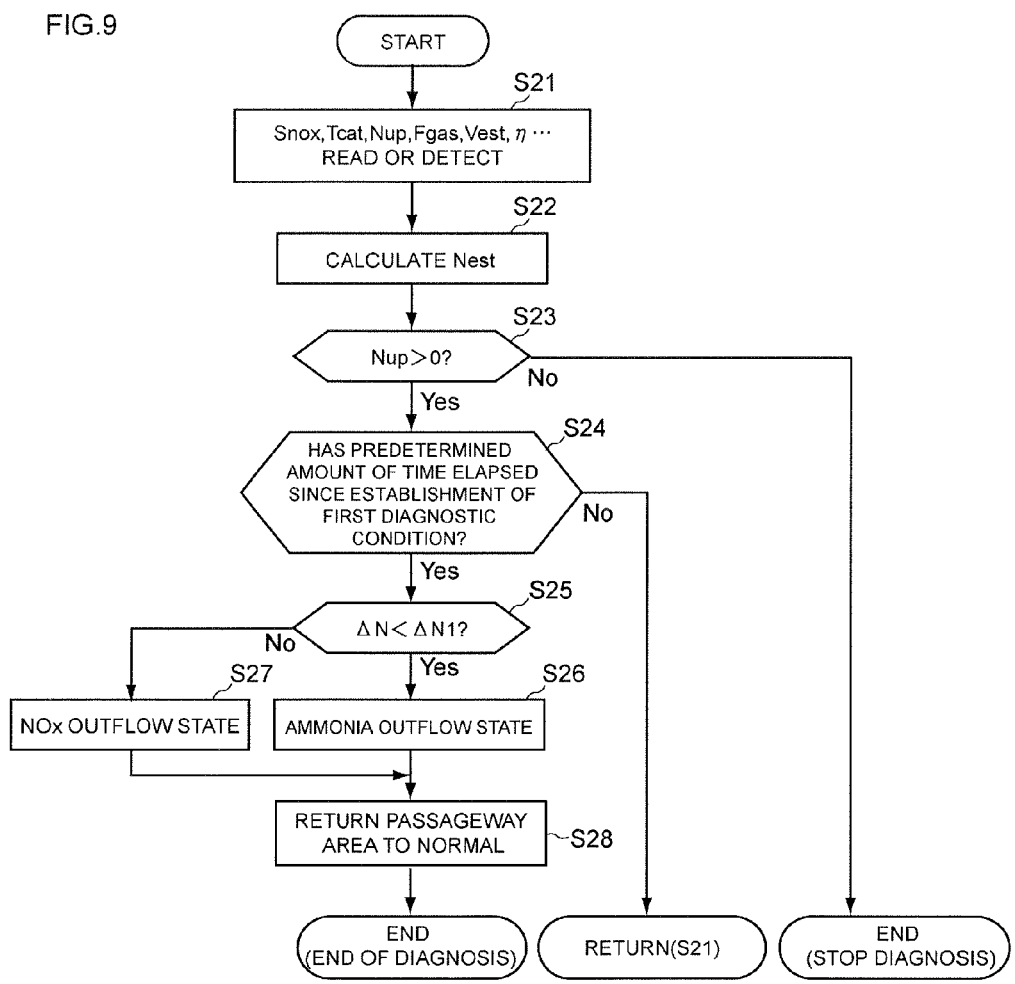

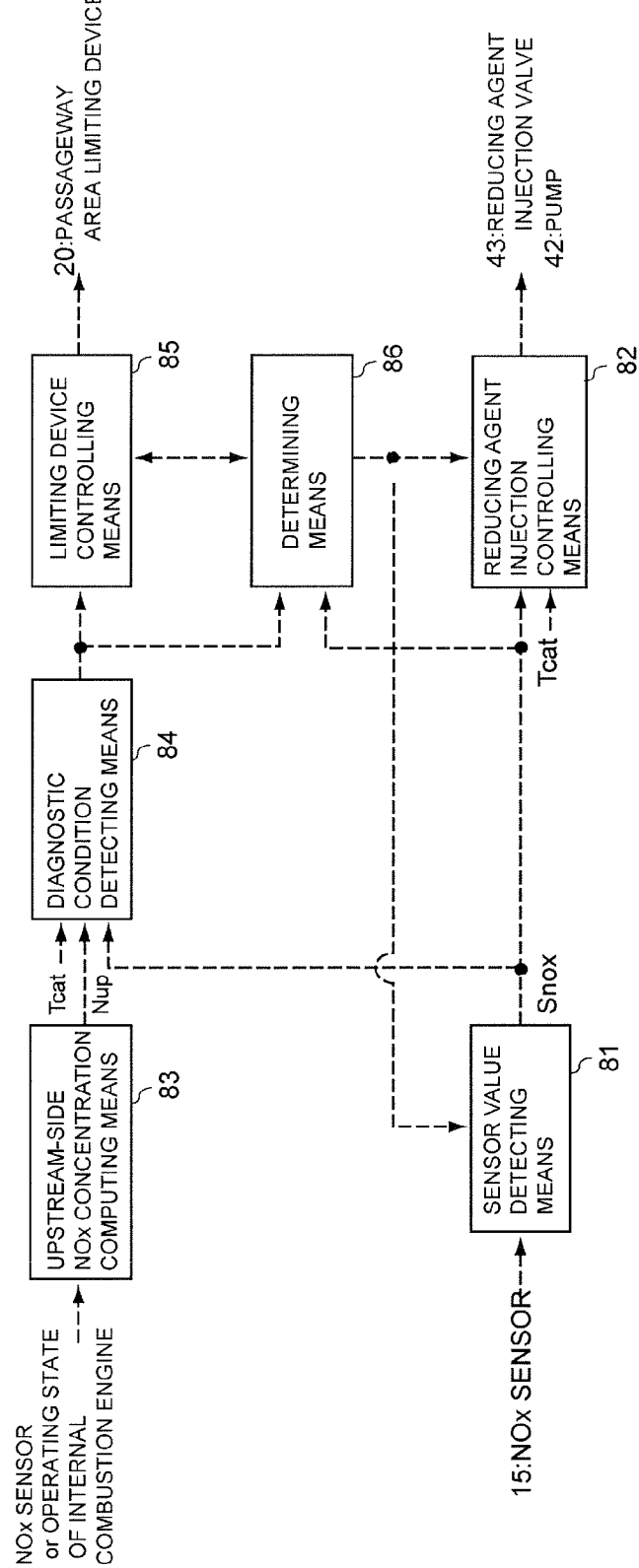

EXHAUST GAS PURIFICATION SYSTEM ABNORMALITY DIAGNOSING DEVICE AND ABNORMALITY DIAGNOSING METHOD, AND EXHAUST GAS PURIFICATION SYSTEM

BACKGROUND

1. Technical Field

The present invention relates to an exhaust gas purification system abnormality diagnosing device and abnormality diagnosing method and an exhaust gas purification system. The present invention particularly relates to an exhaust gas purification system abnormality diagnosing device and abnormality diagnosing method and to an exhaust gas purification system that use ammonia to reduce $NO_x$ (nitrogen oxides) in exhaust gas.

2. Related Art

Nitrogen oxides (hereinafter called "$NO_x$") are often included in exhaust gas emitted from internal combustion engines such as diesel engines. As an exhaust gas purification system for reducing the $NO_x$ and purifying the exhaust gas, there is known an exhaust gas purification system that injects a reducing agent derived from ammonia on an upstream side of a selective reduction catalyst disposed in an exhaust gas passageway, causes the selective reduction catalyst to adsorb the ammonia, causes the $NO_x$ in the exhaust gas flowing into the selective reduction catalyst to reaction with the ammonia, and purifies the exhaust gas.

In this type of exhaust gas purification system, sometimes a sensor for detecting the $NO_x$ concentration on the downstream side of the selective reduction catalyst is disposed and injection control of the reducing agent is performed such that a sensor value of this sensor becomes less than a predetermined value. However, sensors for detecting the $NO_x$ concentration that are disposed in this type of exhaust gas purification system often have the characteristic that they respond also to the ammonia in addition to the $NO_x$. For that reason, in an exhaust gas purification system that uses a reducing agent capable of generating ammonia, the sensor responds and the sensor value rises even when the ammonia has flowed out to the downstream side of the selective reduction catalyst.

Ordinarily, the sensor value of the $NO_x$ sensor is maintained less than an allowable value because the target injection quantity of the reducing agent is obtained by computation in response to the quantity of the $NO_x$ emitted from the internal combustion engine. However, when degradation of the entire exhaust gas purification system occurs, sometimes the deviation of the actual injection quantity with respect to the target injection quantity increases, the catalyst efficiency drops, and the $NO_x$ concentration or the ammonia concentration on the downstream side of the selective reduction catalyst exceeds the allowable value.

The content of measures and control that should be performed thereafter differs between a state in which the $NO_x$ concentration on the downstream side of the selective reduction catalyst is rising and a state in which the ammonia concentration on the downstream side of the selective reduction catalyst is rising. For that reason, it becomes necessary to identify which state is causing the rise in the sensor value. Therefore, there have been disclosed methods of determining, in an exhaust gas purification system that causes $NO_x$ to react with ammonia to purify the exhaust gas, the abnormal state of the exhaust gas purification system on the basis of the sensor value of the $NO_x$ sensor.

For example, there has been disclosed a method by which the added quantity of the ammonia is increased when the actual $NO_x$ purification efficiency derived on the basis of the sensor value of the $NO_x$ sensor is equal to or less than a target $NO_x$ purification efficiency, it is determined that the quantity of the ammonia is insufficient when the actual $NO_x$ purification efficiency after the correction exceeds the actual $NO_x$ purification efficiency before the correction, and it is determined that the increased added ammonia is not acting on $NO_x$ purification—that is, that there is the potential for ammonia slip—when the actual $NO_x$ purification efficiency after the correction is equal to or less than the actual $NO_x$ purification efficiency before the correction (e.g., see JP-A-2003-293743).

Further, there has also been disclosed a method by which the reducing agent injection quantity is decreased when a difference ($NO_x$ concentration deviation) between the actual $NO_x$ concentration obtained by the $NO_x$ sensor and a proper $NO_x$ concentration that has been set beforehand has become greater than a predetermined value, it is determined that there is $NO_x$ slip when the $NO_x$ concentration deviation after decreasing the reducing agent injection quantity has become larger than the $NO_x$ concentration deviation before the decrease, and it is determined that there is ammonia slip when the $NO_x$ concentration deviation after decreasing the reducing agent injection quantity has become smaller than the $NO_x$ concentration deviation before the decrease (e.g., see JP-A-2008-157136).

However, the method described in JP-A-2003-293743 is one by which the reducing agent injection quantity is forcibly increased and the abnormal state of the exhaust gas purification system is determined by the change in the sensor value thereafter. For that reason, when the ammonia concentration on the downstream side of the selective reduction catalyst (hereafter called "the downstream-side ammonia concentration") has risen, there is the fear that the downstream-side ammonia concentration will further rise by implementing the method described in JP-A-2003-293743.

Further, the method described in JP-A-2008-157136 is one by which the reducing agent injection quantity is forcibly decreased and the abnormal state of the exhaust gas purification system is determined by the change in the sensor value thereafter. For that reason, when the $NO_x$ concentration on the downstream side of the selective reduction catalyst (hereafter called "the downstream-side $NO_x$ concentration") has risen, there is the fear that the downstream-side $NO_x$ concentration will further rise by implementing the method described in JP-A-2008-157136.

Moreover, in addition to a rise in the downstream-side $NO_x$ concentration or the downstream-side ammonia concentration, an abnormality in the $NO_x$ sensor where the sensor value of the $NO_x$ sensor becomes large with respect to the actual concentration is also conceivable as causing the abnormal state of the exhaust gas purification system that appears when there is a rise in the sensor value of the $NO_x$ sensor. Even if this abnormal state of the $NO_x$ sensor is occurring, it cannot be distinguished from a rise in the downstream-side $NO_x$ concentration or a rise in the downstream-side ammonia concentration.

Therefore, the inventor of the present invention earnestly endeavored to discover that, focusing on the fact that a selective reduction catalyst has the property that the quantity of the ammonia it is capable of adsorbing increases as the pressure of a gas (exhaust gas) becomes greater, this problem can be solved by raising the exhaust gas pressure with a passageway area limiting device when a gas concentration that is detected has become equal to or greater than a predetermined start-of-diagnosis threshold value or when a difference obtained by subtracting from the gas concentration a downstream-side NO$_x$ concentration estimated by computation has become equal to or greater than a predetermined start-of-diagnosis threshold value and determining the abnormal state on the basis of the gas concentration or the difference thereafter, and thus the inventor completed the present invention. That is, it is an object of the present invention to provide an exhaust gas purification system abnormality diagnosing device and abnormality diagnosing method and an exhaust gas purification system that can determine the abnormal state of an exhaust gas purification system without having to significantly increase the downstream-side NO$_x$ concentration or the downstream-side ammonia concentration.

SUMMARY

According to the present invention, there is provided an exhaust gas purification system abnormality diagnosing device for diagnosing an abnormality occurring in an exhaust gas purification system equipped with a selective reduction catalyst that is capable of adsorbing ammonia and is for using the ammonia to reduce NO$_x$ in exhaust gas emitted from an internal combustion engine, a reducing agent supply device that supplies a reducing agent derived from the ammonia to the inside of an exhaust gas passageway on an upstream side of the selective reduction catalyst, and a specified gas concentration sensor that is disposed on a downstream side of the selective reduction catalyst and responds at least to the NO$_x$ and the ammonia, the exhaust gas purification system abnormality diagnosing device comprising: a sensor value detecting means that reads a sensor signal of the specified gas concentration sensor to detect a gas concentration; a limiting device controlling means which, when the gas concentration has become equal to or greater than a predetermined start-of-diagnosis threshold value or when a difference obtained by subtracting from the gas concentration an estimated NO$_x$ concentration on the downstream side of the selective reduction catalyst obtained by computation has become equal to or greater than a predetermined start-of-diagnosis threshold value, increases the quantity of the ammonia capable of being adsorbed by the selective reduction catalyst by raising the pressure inside the exhaust gas passageway with a passageway area limiting device disposed on the downstream side of the selective reduction catalyst; and a determining means that determines the abnormal state on the basis of the gas concentration or the difference after the pressure inside the exhaust gas passageway has been raised. Thus, the problem described above can be solved.

Further, in configuring the exhaust gas purification system abnormality diagnosing device of the present invention, it is preferred that the determining means determines that the exhaust gas purification system is in a state in which there is outflow of the ammonia when the gas concentration or the difference has decreased after the pressure inside the exhaust gas passageway has been raised.

Further, in configuring the exhaust gas purification system abnormality diagnosing device of the present invention, it is preferred that the abnormality diagnosing device further comprises a first diagnostic condition detecting means that detects the establishment of a first diagnostic condition where the difference is equal to or greater than the start-of-diagnosis threshold value and the internal combustion engine is in a fuel-injecting state, the limiting device controlling means raises the pressure inside the exhaust gas passageway when the first diagnostic condition has been established, and the determining means determines that the exhaust gas purification system is in a state in which there is outflow of the ammonia when the difference after the pressure inside the exhaust gas passageway has been raised is less than a predetermined first determination-use threshold value and determines that the exhaust gas purification system is in a state in which there is a drop in the NO$_x$ purification efficiency when the difference is equal to or greater than the first determination-use threshold value.

Further, in configuring the exhaust gas purification system abnormality diagnosing device of the present invention, it is preferred that the abnormality diagnosing device further comprises a second diagnostic condition detecting means that detects the establishment of a second diagnostic condition where the gas concentration is equal to or greater than the start-of-diagnosis threshold value and the internal combustion engine is in a non-fuel-injecting state, the limiting device controlling means raises the pressure inside the exhaust gas passageway when the second diagnostic condition has been established, and the determining means determines that the exhaust gas purification system is in a state in which there is outflow of the ammonia when the gas concentration after the pressure inside the exhaust gas passageway has been raised is less than a predetermined second determination-use threshold value and determines that the exhaust gas purification system is in a state in which there is an abnormality in the specified gas concentration sensor when the gas concentration is equal to or greater than the second determination-use threshold value.

Further, in configuring the exhaust gas purification system abnormality diagnosing device of the present invention, it is preferred that the determining means compares, with the first determination-use threshold value or the second determination-use threshold value, the gas concentration or the difference after a predetermined amount of time elapses since the pressure inside the exhaust gas passageway has been raised.

Further, in configuring the exhaust gas purification system abnormality diagnosing device of the present invention, it is preferred that the first diagnostic condition includes as a condition the selective reduction catalyst being in an active state.

Another aspect of the present invention is an exhaust gas purification system abnormality diagnosing method for diagnosing an abnormality occurring in an exhaust gas purification system equipped with a selective reduction catalyst that is capable of adsorbing ammonia and is for using the ammonia to reduce NO$_x$ in exhaust gas emitted from an internal combustion engine, a reducing agent supply device that supplies a reducing agent derived from the ammonia to the inside of an exhaust gas passageway on an upstream side of the selective reduction catalyst, and a specified gas concentration sensor that is disposed on a downstream side of the selective reduction catalyst and responds at least to the NO$_x$ and the ammonia, the exhaust gas purification system abnormality diagnosing method comprising: when a gas concentration detected by the specified gas concentration sensor has become equal to or greater than a predetermined start-of-diagnosis threshold value or when a difference obtained by subtracting from the gas concentration an estimated NO$_x$ concentration on the downstream side of the selective reduction catalyst obtained by computation has become equal to or greater than a predetermined start-of-diagnosis threshold value, increasing the quantity of the ammonia capable of being adsorbed by the selective reduction catalyst by raising the pressure inside the exhaust gas passageway with a passageway area limiting device disposed on the downstream side of the selective reduction catalyst and determining the abnormal state on the basis of the gas concentration or the difference thereafter.

Still another aspect of the present invention is an exhaust gas purification system equipped with a selective reduction catalyst that is capable of adsorbing ammonia and is for using the ammonia to reduce $NO_x$ in exhaust gas emitted from an internal combustion engine, a reducing agent supply device that supplies a reducing agent derived from the ammonia to the inside of an exhaust gas passageway on an upstream side of the selective reduction catalyst, and a specified gas concentration sensor that is disposed on a downstream side of the selective reduction catalyst and responds at least to the $NO_x$ and the ammonia, the exhaust gas purification system comprising: a passageway area limiting device that is disposed in the exhaust gas passageway on the downstream side of the selective reduction catalyst; a limiting device controlling means which, when a gas concentration detected by the specified gas concentration sensor has become equal to or greater than a predetermined start-of-diagnosis threshold value or when a difference obtained by subtracting from the gas concentration an estimated $NO_x$ concentration on the downstream side of the selective reduction catalyst obtained by computation has become equal to or greater than a predetermined start-of-diagnosis threshold value, increases the quantity of the ammonia capable of being adsorbed by the selective reduction catalyst by raising the pressure inside the exhaust gas passageway with the passageway area limiting device; and a determining means that determines the abnormal state of the exhaust gas purification system on the basis of the gas concentration or the difference after the pressure inside the exhaust gas passageway has been raised.

According to the exhaust gas purification system abnormality diagnosing device and abnormality diagnosing method and the exhaust gas purification system of the present invention, when the gas concentration has become equal to or greater than the start-of-diagnosis threshold value or when the difference obtained by subtracting the estimated $NO_x$ concentration from the gas concentration has become equal to or greater than the start-of-diagnosis threshold value, the quantity of the ammonia capable of being adsorbed by the selective reduction catalyst is increased by raising the exhaust gas pressure in the region where the selective reduction catalyst is placed, and the abnormal state of the exhaust gas purification system is diagnosed on the basis of the gas concentration or the difference in the gas concentration thereafter. At this time, if this control is implemented in a fuel-injecting state of the internal combustion engine, that is, in a state in which $NO_x$ is included in the exhaust gas and the reducing agent is being injected, when the specified gas concentration sensor has responded to the ammonia, the difference in the gas concentration becomes smaller because some of the ammonia that has flowed out is adsorbed by the selective reduction catalyst. On the other hand, when the specified gas concentration sensor has responded to the $NO_x$, although sometimes the adsorption ratio of the ammonia in the selective reduction catalyst temporarily drops and the catalyst efficiency fluctuates, the catalyst efficiency becomes stable as the adsorption ratio gradually increases, and the specified gas concentration sensor shows a value that is about the same as the difference in the gas concentration before the exhaust gas pressure was raised. Consequently, the abnormal state of the exhaust gas purification system can be diagnosed without having to further raise the downstream-side ammonia concentration or the downstream-side $NO_x$ concentration.

Further, if this control is implemented in a non-fuel-injecting state of the internal combustion engine, that is, in a state in which $NO_x$ is not included in the exhaust gas and injection of the reducing agent is also stopped, when the specified gas concentration sensor has responded to the ammonia, the gas concentration drops because some of the ammonia that has flowed out is adsorbed by the selective reduction catalyst. On the other hand, when the specified gas concentration sensor has shown a larger value than the actual concentration, the gas concentration substantially does not fluctuate. Consequently, the abnormal state of the exhaust gas purification system can be diagnosed without having to further raise the downstream-side ammonia concentration or the downstream-side $NO_x$ concentration.

BRIEF DESCRIPTION OF THE DRAWINGS

FIG. 9 is a flowchart showing one example of a method of determining outflow of ammonia or outflow of $NO_x$;

FIG. 10 is a block diagram showing an example configuration of an abnormality diagnosing device pertaining to a second embodiment;

DETAILED DESCRIPTION

Figure 1:
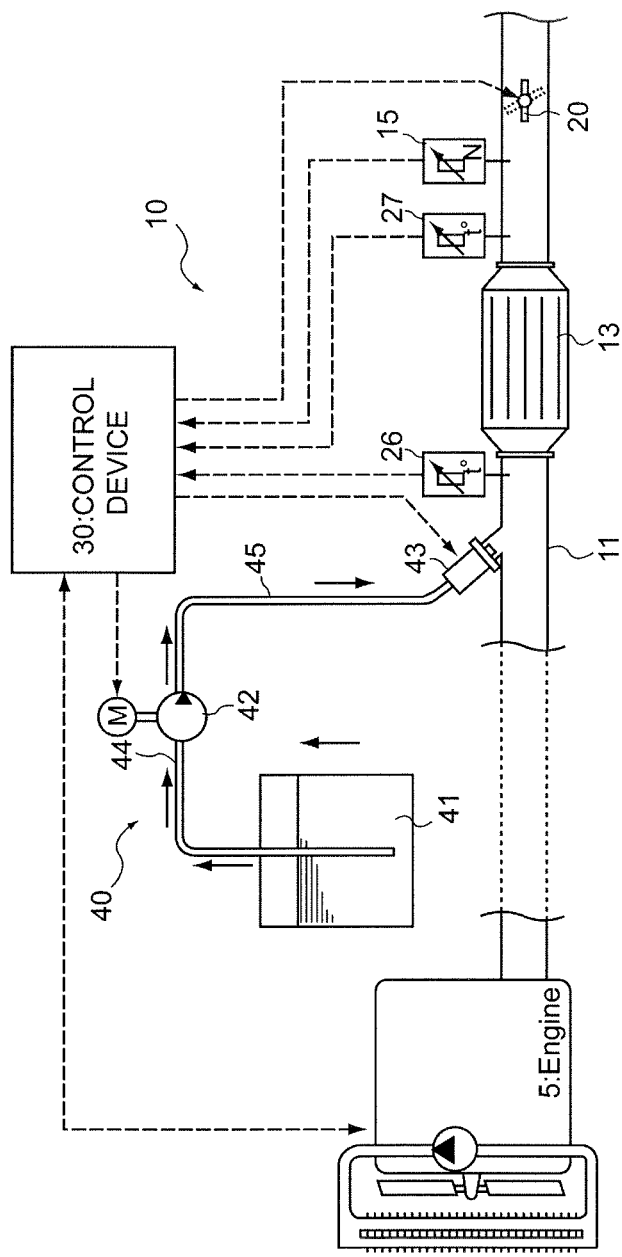
FIG. 1 is a diagram showing an example configuration of an exhaust gas purification system pertaining to a first embodiment of the present invention.

Embodiments relating to an exhaust gas purification system abnormality diagnosing device and abnormality diagnosing method and to an exhaust gas purification system of the present invention will be specifically described below with reference to the drawings. However, the embodiments below represent one aspect of the present invention, are not intended to limit the present invention, and are capable of being arbitrarily changed within the scope of the present invention. In the drawings, members to which the same reference signs have been given represent identical members, and description thereof will be appropriately omitted.

First Embodiment

A first embodiment of the present invention is configured as one which, when a difference obtained by subtracting a downstream-side $NO_x$ concentration estimated by computation from a gas concentration detected by a specified gas concentration sensor is equal to or greater than a predetermined start-of-diagnosis threshold value, determines whether the cause thereof is a $NO_x$ outflow state or an ammonia outflow state.

1. Overall Configuration

First, the overall configuration of the exhaust gas purification system pertaining to the first embodiment of the present invention will be described.

FIG. 1 shows an example configuration of an exhaust gas purification system 10 that injects an aqueous solution of urea serving as a reducing agent on an upstream side of a selective reduction catalyst 13 disposed in an exhaust gas passageway 11 and uses ammonia generated from the aqueous solution of urea to selectively reduce and purify, in the selective reduction catalyst 13, $NO_x$ included in exhaust gas. This exhaust gas purification system 10 is equipped with the selective reduction catalyst 13, a reducing agent supply device 40, a passageway area limiting device 20, and a control device 30 as its main elements. Control of the reducing agent supply device 40 and the passageway area limiting device 20 is performed by the control device 30. The reducing agent is not limited to being an aqueous solution of urea; it suffices for the reducing agent to be one that can supply ammonia to the selective reduction catalyst 13, such as ammonia water.

A temperature sensor 26 is disposed on the upstream side of the selective reduction catalyst 13, and a temperature sensor 27 and a $NO_x$ sensor 15 are disposed on the downstream side of the selective reduction catalyst 13. Of these, the upstream-side temperature sensor 26 and the downstream-side temperature sensor 27 are used to detect the exhaust gas temperature and to estimate the catalyst temperature, but they may also be configured to estimate by computation. Further, the $NO_x$ sensor 15 is used as a specified gas concentration sensor to detect mainly the $NO_x$ concentration in the exhaust gas. The $NO_x$ sensor 15 of the present embodiment has the characteristic that, structurally, it responds also to the ammonia in addition to the $NO_x$. For that reason, when the ammonia flows out to the downstream side of the selective reduction catalyst 13, the $NO_x$ sensor 15 responds also to this ammonia.

Figure 2A:
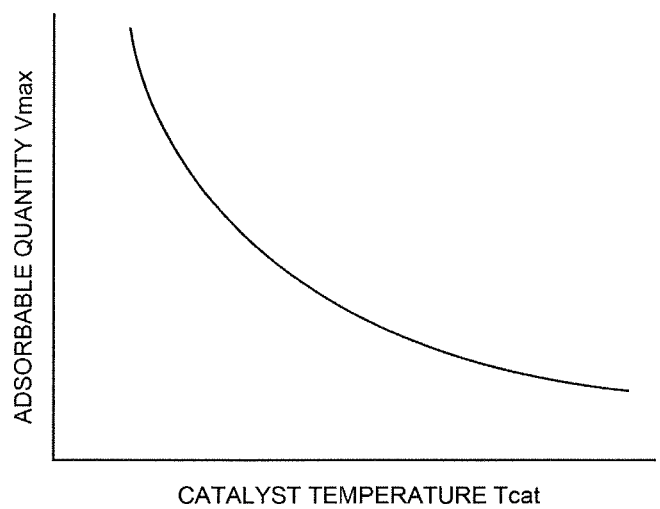
FIG. 2A is a diagram showing the relationship between a catalyst temperature and an adsorbable quantity.
Figure 2B:
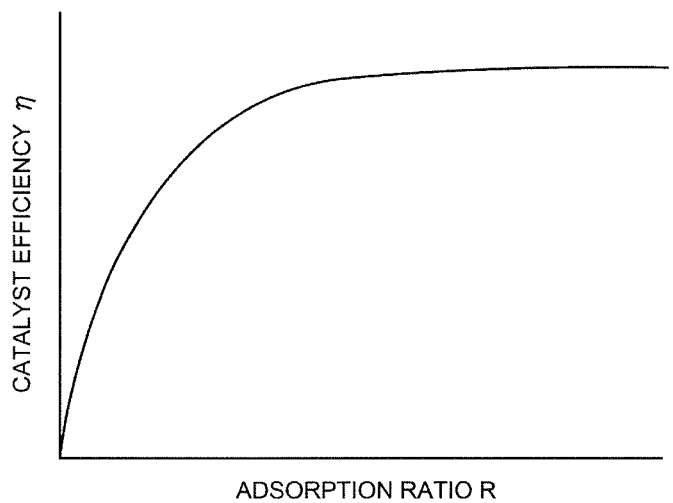
FIG. 2B is a diagram showing the relationship between an adsorption ratio and a catalyst efficiency.

The selective reduction catalyst 13 is configured as a catalyst that adsorbs the ammonia generated as a result of the aqueous solution of urea serving as the reducing agent hydrolyzing and promotes a reduction reaction between the $NO_x$ in the inflowing exhaust gas and the ammonia. A zeolite catalyst, for example, is used for the selective reduction catalyst 13. This selective reduction catalyst 13 has the characteristic that, as shown in FIG. 2A, a quantity Vmax of the ammonia it is capable of adsorbing decreases as its catalyst temperature Tcat becomes higher and has the characteristic that, as shown in FIG. 2B, its catalyst efficiency η becomes higher the larger its adsorption ratio R with respect to the adsorbable quantity Vmax is. Further, the selective reduction catalyst 13 has the characteristic that it exhibits a high catalyst efficiency η when its catalyst temperature Tcat exceeds its active temperature Tcat0.

Figure 3:
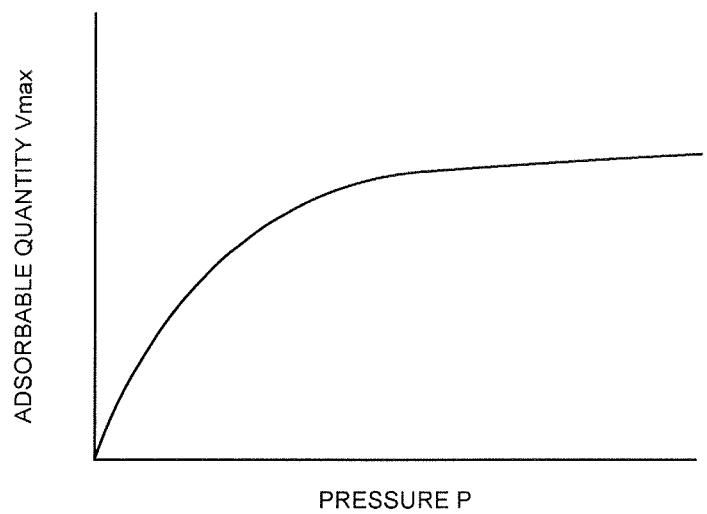
FIG. 3 is a diagram showing the relationship between an exhaust gas pressure and a quantity capable of being adsorbed by a selective reduction catalyst.

Moreover, as shown in FIG. 3, the selective reduction catalyst 13 has the characteristic that its adsorbable quantity Vmax increases the higher the pressure—that is, the exhaust gas pressure P—in the region where the selective reduction catalyst 13 is placed becomes. This characteristic is explained by the Langmuir adsorption isotherm shown in equation (1) below.

$$V = a \times b \times p / (1 + b \times p) \quad (1)$$

V: adsorption quantity
a: proportional constant
b: adsorption rate constant K/desorption rate constant K'
p: exhaust gas pressure According to equation (1), it will be understood that the smaller the value of b is—that is, the easier it is for the desorption rate constant K' to become large with respect to the adsorption rate constant K in a state in which the catalyst temperature Tcat is high—the larger the fluctuation in the adsorbable quantity Vmax with respect to the change in the exhaust gas pressure P becomes, and a greater effect of increasing the adsorbable quantity Vmax by raising the exhaust gas pressure P is obtained.

2. Reducing Agent Supply Device

The reducing agent supply device 40 is configured by a reducing agent injection valve 43, a storage tank 41, and a pressure-feed pump 42. The pressure-feed pump 42 and the storage tank 41 are interconnected by a first supply passageway 44, and the pressure-feed pump 42 and the reducing agent injection valve 43 are interconnected by a second supply passageway 45.

A motor-driven pump is representatively used for the pressure-feed pump 42, and the pressure-feed pump 42 pumps up the reducing agent inside the storage tank 41 and pressure-feeds the reducing agent to the reducing agent injection valve 43. Further, the reducing agent injection valve 43 is disposed in the exhaust gas passageway 11 on the upstream side of the selective reduction catalyst 13, and a reducing agent injection valve on which opening-and-closing control is performed by electric current control, for example, is used for the reducing agent injection valve 43.

The reducing agent supply device 40 may have a configuration such as described above where the reducing agent is supplied from the reducing agent injection valve 43 directly to the inside of the exhaust gas passageway 11 or may have, for example, an air-assist configuration where high-pressure air is used to turn the reducing agent into a mist and the mist is supplied to the inside of the exhaust gas passageway 11.

3. Passageway Area Limiting Device

The passageway area limiting device 20 disposed on the downstream side of the selective reduction catalyst 13 is used to raise the exhaust gas pressure P on the upstream side thereof by limiting the passage area of the exhaust gas. In particular, the purpose of the passageway area limiting device 20 is to raise the exhaust gas pressure P in the region where the selective reduction catalyst 13 is placed. A butterfly valve having the same configuration as that of an exhaust gas valve disposed in an internal combustion engine 5 is used for this passageway area limiting device 20. However, the configuration of the passageway area limiting device 20 is not particularly limited as long as it is means by which the area of the exhaust gas passageway 11 can be made variable. For example, the passageway area limiting device 20 can also be configured by an exhaust gas shutter or the like.

In the exhaust gas purification system 10 shown in FIG. 1, the passageway area limiting device 20 is disposed in the exhaust gas passageway 11 on the downstream side of the $NO_x$ sensor 15, but as long as it is capable of achieving its purpose of raising the exhaust gas pressure P, it may also be disposed in the exhaust gas passageway 11 on the downstream side of the selective reduction catalyst 13 and on the upstream side of the $NO_x$ sensor 15.

4. Control Device

Figure 4:
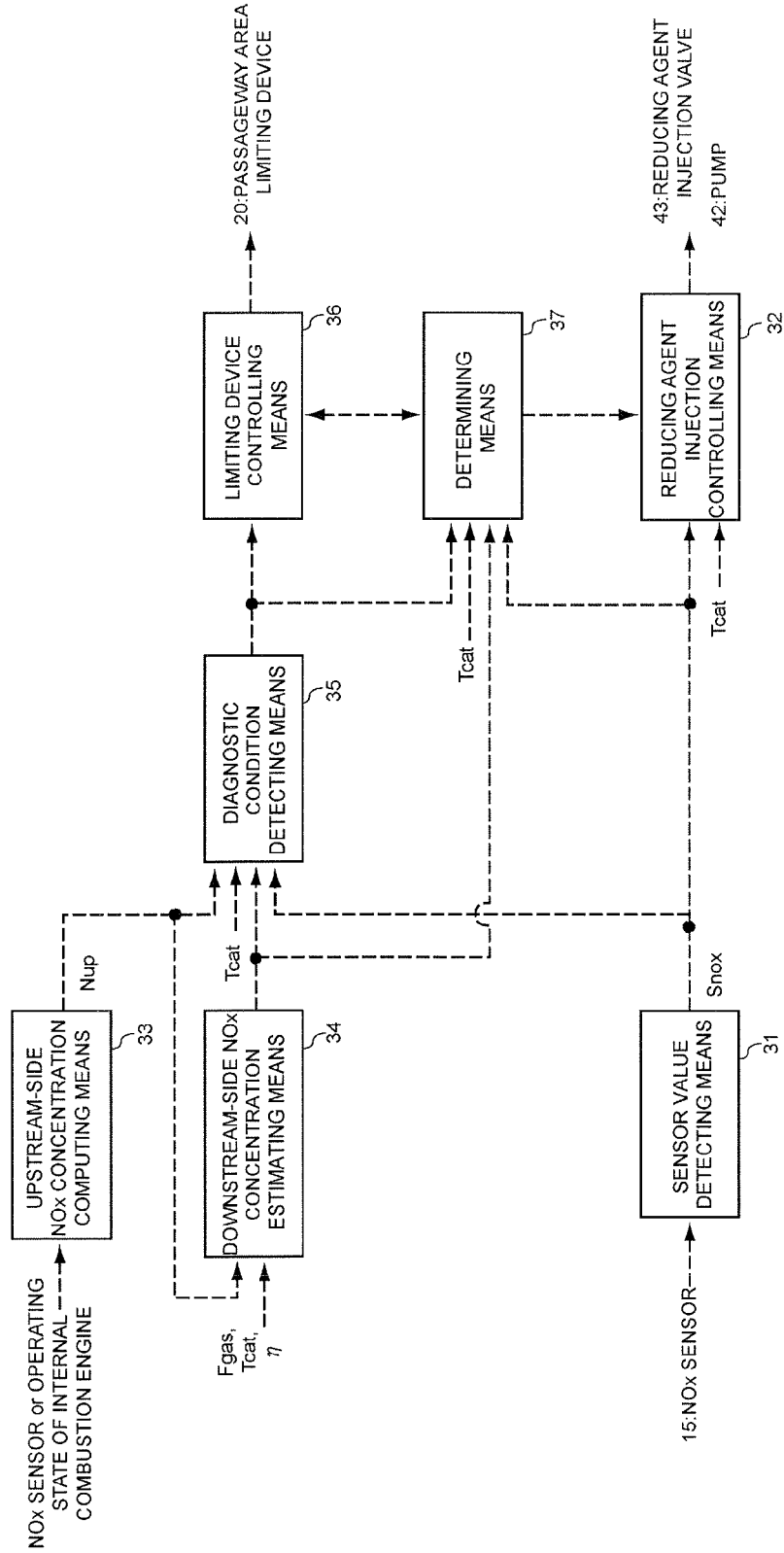
FIG. 4 is a block diagram showing an example configuration of an abnormality diagnosing device pertaining to the first embodiment.

FIG. 4 shows an example configuration in which portions of the configuration of the control device 30 disposed in the exhaust gas purification system 10 relating to diagnostic control of the abnormal state are represented by functional blocks. That is, the control device 30 is configured as the exhaust gas purification system abnormality diagnosing device of the present invention.

This control device 30 is equipped with a sensor value detecting means 31, a reducing agent injection controlling means 32, an upstream-side $NO_x$ concentration computing means 33, a downstream-side $NO_x$ concentration estimating means 34, a diagnostic condition detecting means 35, a limiting device controlling means 36, and a determining means 37 as its main components. The control device 30 is configured mainly by a publicly-known microcomputer, and each means is specifically realized by the execution of a program by the microcomputer. Further, the control device 30 is equipped with a storing means such as a random access memory (RAM), and various forms of information are stored in the storing means.

(1) Sensor Value Detecting Means

The sensor value detecting means 31 is configured to read sensor information of the $NO_x$ sensor 15 to detect a gas concentration Snox (hereinafter this gas concentration will be called "the detected gas concentration"). As has already been described, this detected gas concentration Snox is basically recognized as the downstream-side $NO_x$ concentration, but sometimes it actually represents the ammonia concentration.

(2) Reducing Agent Injection Controlling Means

The reducing agent injection controlling means 32 is configured to control the driving of the pressure-feed pump 42 and the reducing agent injection valve 43 configuring the reducing agent supply device 40. Specifically, the reducing agent injection controlling means 32 controls the pressure-feed pump 42 such that the pressure of the reducing agent supplied to the reducing agent injection valve 43 is maintained at a predetermined value. Further, the reducing agent injection controlling means 32 obtains a required quantity of the ammonia that should be supplied to the selective reduction catalyst 13, calculates a target injection quantity Qudtgt of the reducing agent such that a quantity of the ammonia corresponding to the required quantity is generated, and performs electric current control of the reducing agent injection valve 43 on the basis of this target injection quantity Qudtgt.

Further, in computing the target injection quantity Qudtgt, a current estimated adsorption quantity Vest of the ammonia in the selective reduction catalyst 13 is obtained, and the reducing agent injection controlling means 32 is also equipped with the function of computing the adsorption ratio R with respect to the current adsorbable quantity Vmax.

Figure 5:
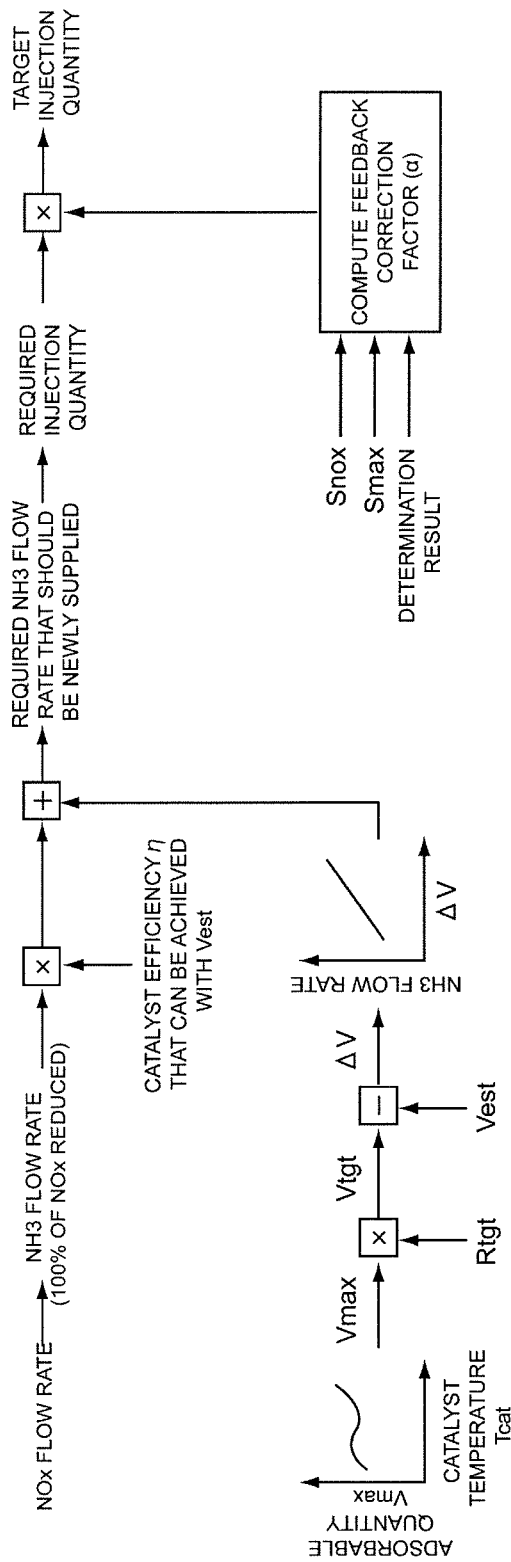
FIG. 5 is a diagram for describing one example of a method of computing a target injection quantity of a reducing agent.

FIG. 5 is a diagram conceptually showing one example of arithmetic processing of the target injection quantity Qudtgt of the reducing agent by the reducing agent injection controlling means 32 of the control device 30 disposed in the exhaust gas purification system 10 of the present embodiment. The arithmetic processing of the target injection quantity Qudtgt described below is executed each predetermined injection cycle.

In this example, first, the reducing agent injection controlling means 32 calculates a map of the adsorbable quantity Vmax of the reducing agent in response to the catalyst temperature Tcat and multiplies a target adsorption ratio Rtgt by this adsorbable quantity Vmax, whereby a target adsorption quantity Vtgt of the ammonia is obtained. Thereafter, the reducing agent injection controlling means 32 subtracts from the target adsorption quantity Vtgt the current estimated adsorption quantity Vest of the ammonia in the selective reduction catalyst 13 obtained at the time of the previous target adsorption quantity computation, whereby an excess or deficient ammonia quantity $\Delta V$ with respect to the target adsorption quantity Vtgt is calculated and the flow rate of the ammonia corresponding to the excess or deficient ammonia quantity $\Delta V$ is obtained. The current estimated adsorption quantity Vest of the ammonia is obtained as an integral value of the excess or deficient ammonia quantity $\Delta V$ in each injection cycle.

In parallel with this, the flow rate of the ammonia assumed to be able to reduce 100% of the $NO_x$ is obtained on the basis of the $NO_x$ sensor 15 and the current flow rate of the $NO_x$ in the exhaust gas obtained by computation. The flow rate of the $NO_x$ can, for example, be obtained by multiplying the $NO_x$ concentration on the upstream side of the selective reduction catalyst 13 by the flow rate of the exhaust gas. Thereafter, the flow rate of the ammonia for reducing the $NO_x$ in the currently flowing exhaust gas is obtained by multiplying the catalyst efficiency $\eta$ corresponding to the current estimated adsorption quantity Vest of the ammonia in the selective reduction catalyst 13 by the flow rate of the ammonia that has been obtained.

The catalyst efficiency $\eta(\%)$ corresponding to the estimated adsorption quantity Vest can be obtained by map calculation. In the control device 30, a data map is stored beforehand such that the catalyst efficiency $\eta(\%)$ is obtained on the basis of the catalyst temperature Tcat and the adsorption ratio R of the ammonia. The adsorption ratio R of the ammonia is obtained as a ratio of the estimated adsorption quantity Vest with respect to the adsorbable quantity Vmax.

However, the method of estimating the catalyst efficiency $\eta(\%)$ is not limited to this method, and the catalyst efficiency $\eta$ can also be modeled in consideration of the catalyst temperature Tcat, the estimated adsorption quantity Vest of the ammonia in the selective reduction catalyst 13, a flow rate Fgas of the exhaust gas, the $NO_x$ concentration on the upstream side of the selective reduction catalyst 13, the ratio of the upstream $NO_x$ concentration and the upstream $NO_2$ concentration, and the degree of degradation of the selective reduction catalyst 13.

After the required flow rate of the ammonia that should be newly supplied has been calculated by adding together the flow rate of the ammonia corresponding to the excess or deficient ammonia quantity $\Delta V$ and the flow rate of the ammonia for reducing the $NO_x$ in the exhaust gas that have each been calculated, the quantity of the reducing agent that can generate the ammonia with this required flow rate that should be supplied is calculated. This quantity of the reducing agent corresponds to a required injection quantity Qudtgt' of the reducing agent.

Thereafter, a feedback correction factor $\alpha$ is obtained by arithmetic processing based on a difference $\Delta S$ between the detected gas concentration Snox and a predetermined allowable gas concentration Smax and information of a result of determination by the later-described determining means 37, and the target injection quantity Qudtgt is calculated by multiplying this feedback correction factor $\alpha$ by the required injection quantity Qudtgt'. The reducing agent injection controlling means 32 executes electric current control of the reducing agent injection valve 43 on the basis of this target injection quantity Qudtgt.

In obtaining the target injection quantity Qudtgt of the reducing agent in this way, the information of the determination result is used to discriminate whether the detected gas concentration Snox detected by the $NO_x$ sensor 15 represents the downstream-side ammonia concentration or the downstream-side $NO_x$ concentration.

Specifically, when the correction of the required injection quantity Qudtgt' by feedback control based on the difference $\Delta S$ between the detected gas concentration Snox and the allowable gas concentration Smax is performed assuming that the detected gas concentration Snox detected by the $NO_x$ sensor 15 represents the downstream-side $NO_x$ concentration, the downstream-side ammonia concentration becomes further raised in a state in which the ammonia is outflowing on the downstream side of the selective reduction catalyst 13.

For that reason, in the control device 30 of the present embodiment, the determining means 37 is configured to determine whether the exhaust gas purification system 10 is in a state in which the ammonia flows out on the downstream side of the selective reduction catalyst 13 or is in a state in which $NO_x$ with a relatively large flow rate flows out. The reducing agent injection controlling means 32 is configured to receive the information of that determination result and discriminate whether the detected gas concentration Snox represents the downstream-side ammonia concentration or the downstream-side $NO_x$ concentration.

For example, when an abnormal state in which ammonia flows out is occurring, the detected gas concentration Snox is discriminated as representing the downstream-side ammonia concentration, and feedback control based on the difference ΔS between the allowable gas concentration Smax and the detected gas concentration Snox is performed such that the injection quantity of the reducing agent decreases. On the other hand, when an abnormal state in which the $NO_x$ flows out is occurring, the detected gas concentration Snox is discriminated as representing the downstream-side $NO_x$ concentration, and feedback control based on the difference ΔS between the allowable gas concentration Smax and the detected gas concentration Snox is performed such that the injection quantity of the reducing agent increases.

However, the method of computing the target injection quantity Qudtgt is not limited to the example described above, and various methods can be employed. Further, the method of computing the estimated adsorption quantity Vest is also not limited to the example described above, and the reducing agent injection controlling means 32 may also be configured to obtain the estimated adsorption quantity Vest separately from computing the target injection quantity Qudtgt.

(3) Upstream-side $NO_x$ Concentration Computing Means

The upstream-side $NO_x$ concentration computing means 33 is configured to obtain a $NO_x$ concentration Nup on the upstream side of the selective reduction catalyst 13 (hereinafter called "the upstream-side $NO_x$ concentration"). Examples of specific methods of obtaining the upstream-side $NO_x$ concentration include a method where the upstream-side $NO_x$ concentration is detected using a $NO_x$ sensor disposed on the upstream side of the selective reduction catalyst 13 and a method where the upstream-side $NO_x$ concentration is estimated by calculation on the basis of the operating state of the internal combustion engine 5, but the method of obtaining the upstream-side $NO_x$ concentration is not particularly limited.

(4) Downstream-side $NO_x$ Concentration Estimating Means

The downstream-side $NO_x$ concentration estimating means 34 is configured to obtain an estimated downstream-side $NO_x$ concentration Nest by computation. The method by which the downstream-side $NO_x$ concentration estimating means 34 computes the estimated downstream-side $NO_x$ concentration Nest is not particularly limited and can be executed by various forms of computation. For example, the downstream-side $NO_x$ concentration estimating means 34 can obtain the estimated downstream-side $NO_x$ concentration Nest by obtaining the upstream-side $NO_x$ concentration Nup, the flow rate Fgas of the exhaust gas, the catalyst temperature Teat, the catalyst efficiency η, and so forth by detection or computation and calculating the flow rate of the $NO_x$ that cannot be purified by the selective reduction catalyst 13 on the basis of these pieces of information. However, when a deviation between the actual injection quantity and the target injection quantity Qudtgt (Qudtgt') of the reducing agent resulting from the reducing agent supply device 40 or a deviation in the catalyst efficiency η resulting from catalyst degradation or the like is occurring, a deviation occurs between the estimated downstream-side $NO_x$ concentration Nest and the detected gas concentration Snox that is detected using the $NO_x$ sensor 15.

(5) Diagnostic Condition Detecting Means

The diagnostic condition detecting means 35 is configured to detect a state in which the exhaust gas purification system 10 is capable of executing control that performs a diagnosis of the abnormal state. The diagnostic condition detecting means 35 sends a start-of-diagnosis signal to the limiting device controlling means 36 and the determining means 37 when this state is being detected.

The control device 30 of the present embodiment is configured such that it can determine whether the current exhaust gas purification system 10 is in a state in which the $NO_x$ easily flows out to the downstream side of the selective reduction catalyst 13 or is in a state in which the ammonia easily flows out to the downstream side of the selective reduction catalyst 13. For that reason, the diagnostic condition detecting means 35 is configured to detect a first diagnostic condition, which includes a difference ΔN obtained by subtracting the estimated downstream-side $NO_x$ concentration Nest from the detected gas concentration Snox being equal to or greater than a predetermined first start-of-diagnosis threshold value ΔN0 and the upstream-side $NO_x$ concentration Nup not being zero.

The difference ΔN being equal to or greater than the first start-of-diagnosis threshold value ΔN0 means that the exhaust gas purification system 10 is in a state in which the value of the detected gas concentration Snox on which control is originally performed so as to become equal to or less than a predetermined value is excessively rising. The first start-of-diagnosis threshold value ΔN0 that is compared with the difference ΔN can be appropriately set in consideration of the allowed downstream-side $NO_x$ concentration or downstream-side ammonia concentration.

Further, the upstream-side $NO_x$ concentration Nup not being zero means that fuel injection is being performed in the internal combustion engine 5 and that the exhaust gas purification system 10 is in a state in which $NO_x$ is included in the exhaust gas. However, the condition may also be different as long as that state can be detected. For example, the fuel injection quantity of the internal combustion engine 5 or the injection quantity of the reducing agent not being zero can also be used as a condition.

Further, in the present embodiment, the catalyst temperature Teat being higher than the active temperature Tcat0 is also included in the first diagnostic condition. That is, the exhaust gas purification system 10 being in a state in which the effect of increasing the adsorbable quantity Vmax is easily obtained when the exhaust gas pressure P has been increased by limiting the passageway area is a condition. By adding this condition of the catalyst temperature Teat to the first diagnostic condition, when the exhaust gas pressure P has been raised when the ammonia is outflowing to the downstream side of the selective reduction catalyst 13, for example, the outflow of the ammonia can be reliably decreased, so the fear that the abnormal state will be erroneously determined as one in which the $NO_x$ is outflowing to the downstream side of the selective reduction catalyst 13 can be reduced.

Further, by adding the condition of the catalyst temperature Teat to the first diagnostic condition, the control that raises the exhaust gas pressure P becomes executed only in a state in which the effect of increasing the adsorbable quantity Vmax is reliably obtained, so the load on the internal combustion engine 5 can be prevented from being increased more than necessary.

(6) Limiting Device Controlling Means

The limiting device controlling means 36 is configured to control the passageway area limiting device 20 disposed on the downstream side of the selective reduction catalyst 13. In the present embodiment, the limiting device controlling means 36 is configured to limit the passageway area when it has received the start-of-diagnosis signal from the diagnostic condition detecting means 35. When the passageway area is limited, the exhaust gas pressure P in the region where the selective reduction catalyst 13 is placed rises and the quantity Vmax of the ammonia adsorbable by the selective reduction catalyst 13 increases. Further, the limiting device controlling means 36 returns the passageway area to normal when it has detected an end-of-determination signal sent from the determining means 37 after it has limited the passageway area.

In the example of the present embodiment, the limiting device controlling means 36 is configured to control the passageway area limiting device 20 to switch the passageway area between either a state in which the passageway area is limited and a state in which the passageway area is not limited, but the limiting device controlling means 36 may also be configured to control the passageway area limiting device 20 to switch the area of the exhaust gas passageway in multiple stages. However, in this case, it is necessary to store beforehand a data map or the like of the adsorbable quantities Vmax corresponding to the each passageway area.

(7) Determining Means

The determining means 37 is configured to determine the abnormal state of the exhaust gas purification system 10 on the basis of the difference $\Delta N$ between the detected gas concentration Snox, which is detected after the determining means 37 has received the start-of-diagnosis signal from the diagnostic condition detecting means 35, and the estimated downstream-side $NO_x$ concentration Nest. In the present embodiment, the determining means 37 is configured to compare the difference $\Delta N$, which is obtained after the determining means 37 has received the start-of-diagnosis signal, with a first determination-use threshold value $\Delta N1$. When the difference $\Delta N$ is less than the first determination-use threshold value $\Delta N1$, the determining means 37 determines that the exhaust gas purification system 10 is in a state in which the ammonia is outflowing to the downstream side of the selective reduction catalyst 13. When the difference $\Delta N$ is equal to or greater than the first determination-use threshold value $\Delta N1$, the determining means 37 determines that the exhaust gas purification system 10 is in a state in which the $NO_x$ is outflowing to the downstream side of the selective reduction catalyst 13. The determination result is used to discriminate whether the detected gas concentration Snox represents the downstream-side ammonia concentration or represents the downstream-side $NO_x$ concentration.

Figure 6A:
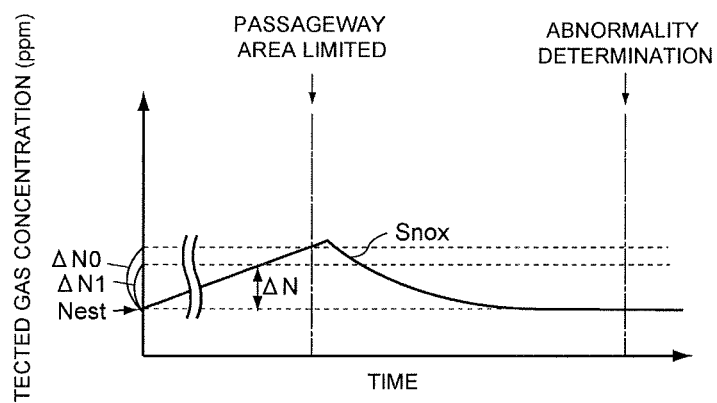
FIGS. 6A and 6B are diagrams showing changes in a difference between a detected gas concentration and an estimated downstream-side $NO_x$ concentration before and after limiting a passageway area in each of an ammonia outflow state and a $NO_x$ outflow state.
Figure 6B:
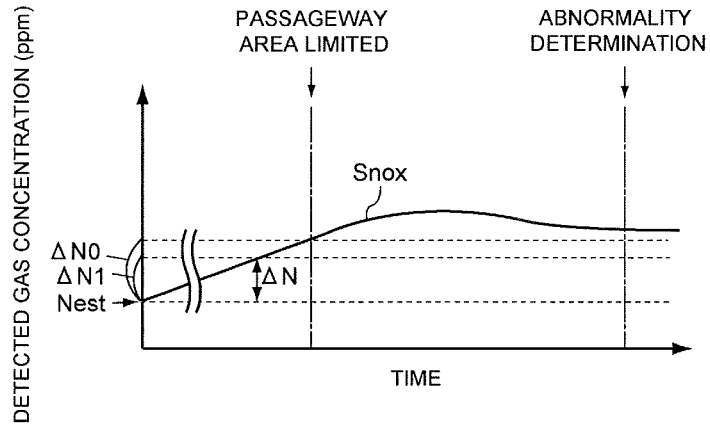

FIGS. 6A and 6B show changes in the detected gas concentration Snox when the passageway area has been limited in each of a state in which the ammonia is outflowing and a state in which the $NO_x$ is outflowing. However, in order to facilitate understanding, it will be assumed that the upstream-side $NO_x$ concentration Nup, the flow rate Fgas of the exhaust gas, and the catalyst temperature Tcat are constant, and the estimated downstream-side $NO_x$ concentration Nest shows a constant value.

FIG. 6A shows the change in the detected gas concentration Snox in a state in which the ammonia is outflowing. That is, the detected gas concentration Snox represents the downstream-side ammonia concentration. In this case, when the passageway area is limited and the quantity Vmax of the ammonia adsorbable by the selective reduction catalyst 13 increases, the quantity of the outflowing ammonia decreases because the quantity of the ammonia adsorbed by the selective reduction catalyst 13 increases. For that reason, the detected gas concentration Snox gradually begins to decrease as a result of the passageway area being limited and, after the elapse of a predetermined amount of time, becomes stable in a state in which the difference $\Delta N$ between the detected gas concentration Snox and the estimated downstream-side $NO_x$ concentration Nest has become smaller.

FIG. 6B shows the change in the detected gas concentration Snox in a state in which the $NO_x$ is outflowing. That is, the detected gas concentration Snox represents the downstream-side $NO_x$ concentration. In this case, substantially all of the ammonia flowing into the selective reduction catalyst 13 is being adsorbed, so when the passageway area is limited and the quantity Vmax of the ammonia adsorbable by the selective reduction catalyst 13 increases, the adsorption ratio of the ammonia temporarily decreases and the catalyst efficiency $\eta$ also temporarily drops. For that reason, the flow rate of the $NO_x$ outflowing to the downstream side of the selective reduction catalyst 13 increases and the detected gas concentration Snox temporarily rises. However, because the consumption of the ammonia used in the reduction reaction decreases in accompaniment with the drop in the catalyst efficiency the quantity of the ammonia adsorbed by the selective reduction catalyst 13 gradually increases and the catalyst efficiency $\eta$ shifts to an increase, whereby the detected gas concentration Snox shifts to a decrease. As a result, after the elapse of the predetermined amount of time, the catalyst efficiency $\eta$ becomes stable, and the difference $\Delta N$ between the detected gas concentration Snox and the estimated downstream-side $NO_x$ concentration Nest becomes stable in a state in which it is larger than it is in the state in which the ammonia is outflowing.

FIG. 6B shows one example of the change in the detected gas concentration Snox in a state in which the $NO_x$ is outflowing. Depending on the operating state of the internal combustion engine 5, the ammonia adsorption characteristic of the selective reduction catalyst 13, and the way in which the target adsorption quantity Vtgt of the selective reduction catalyst 13 is set, it is also possible for the catalyst efficiency $\eta$ to temporarily rise as a result of the passageway area being limited.

Here, the downstream-side ammonia concentration changes relatively gently, so in the present embodiment, the determining means 37 is configured to determine the abnormal state by comparing, with the first determination-use threshold value $\Delta N1$, the value of the difference $\Delta N$ after a predetermined amount of time has elapsed since receiving the start-of-diagnosis signal and the state has become stable. In order to avoid erroneous determination, it is preferable for the first determination-use threshold value $\Delta N1$ to be set at least to a value equal to or less than the first start-of-diagnosis threshold value $\Delta N0$ serving as the first diagnostic condition. The first determination-use threshold value $\Delta N1$ can also be set to the same value as the first start-of-diagnosis threshold value $\Delta N0$ serving as the first diagnostic condition, but it can also be set to a value corresponding to the extent of the increase in the adsorbable quantity Vmax resulting from the passageway area being limited and the exhaust gas pressure P rising.

The larger the extent of the increase in the adsorbable quantity Vmax is, the larger the degree of the decrease in the outflow quantity when the ammonia is outflowing is, and the smaller the extent of the increase in the adsorbable quantity Vmax is, the smaller the degree of the decrease in the outflow quantity when the ammonia is outflowing is. Consequently, the larger the extent of the rise in the exhaust gas pressure P is, the smaller the difference ΔN when the ammonia is outflowing becomes, so it becomes possible to set the first determination-use threshold value ΔN1 to a relatively small value. By using the first determination-use threshold value ΔN1 corresponding to the extent of the rise in the exhaust gas pressure P and not a value that is the same as the first start-of-diagnosis threshold value ΔN0 serving as the first diagnostic condition, it becomes easy to determine the abnormal state on the basis of the difference ΔN after the passageway area has been limited.

Further, in the present embodiment, the determining means 37 is configured to use, in the comparison with the first determination-use threshold value ΔN1, the value of the difference ΔN after the predetermined amount of time has elapsed after since receiving the start-of-diagnosis signal and the state has become stable. For this reason, the fear that an abnormal state will be erroneously determined as a result of the value of the difference ΔN that is in fluctuation being compared with the first determination-use threshold value ΔN1 is reduced. The predetermined amount of time from when the determining means 37 receives the start-of-diagnosis signal to until the value of the difference ΔN becomes stable can be obtained by an experiment or the like beforehand and is set to be about 1 to 2 minutes, for example. Or, the predetermined amount of time may also be a variable value that fluctuates in response to the catalyst efficiency η or the like. Further, the criterion for starting measurement of the predetermined amount of time may be not only when the determining means 37 has received the start-of-diagnosis signal but also when the control that limits the passageway area has been executed.

When the determining means 37 finishes determining the abnormal state, it sends an end-of-determination signal to the limiting device controlling means 36 and transmits information of the determination result of the abnormal state to the reducing agent injection controlling means 32.

In determining which of the abnormal state in which the ammonia is outflowing and the abnormal state in which the $NO_x$ is outflowing the exhaust gas purification system 10 is in, the determining means 37 may decide the abnormal state on the basis of a one-time determination result, but the determining means 37 can also be configured to decide the abnormal state when the same determination result has been obtained continuously a predetermined number of times. By configuring the determining means 37 in this way, the fear that the determining means 37 will erroneously determine the abnormal state can be reduced.

5. Abnormality Diagnosing Method

Figure 7:
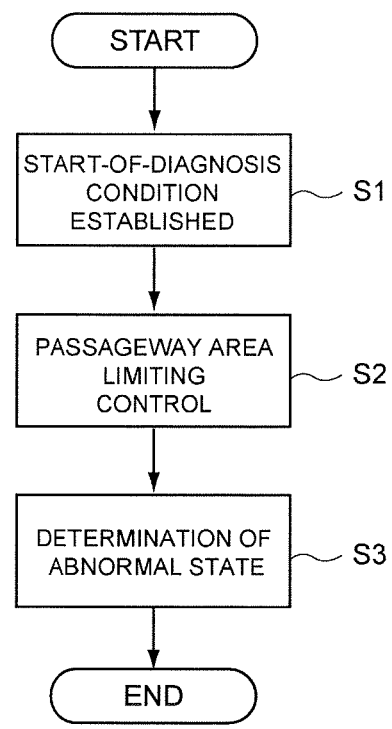
FIG. 7 is a flowchart for describing an abnormality diagnosing method.
Figure 8:
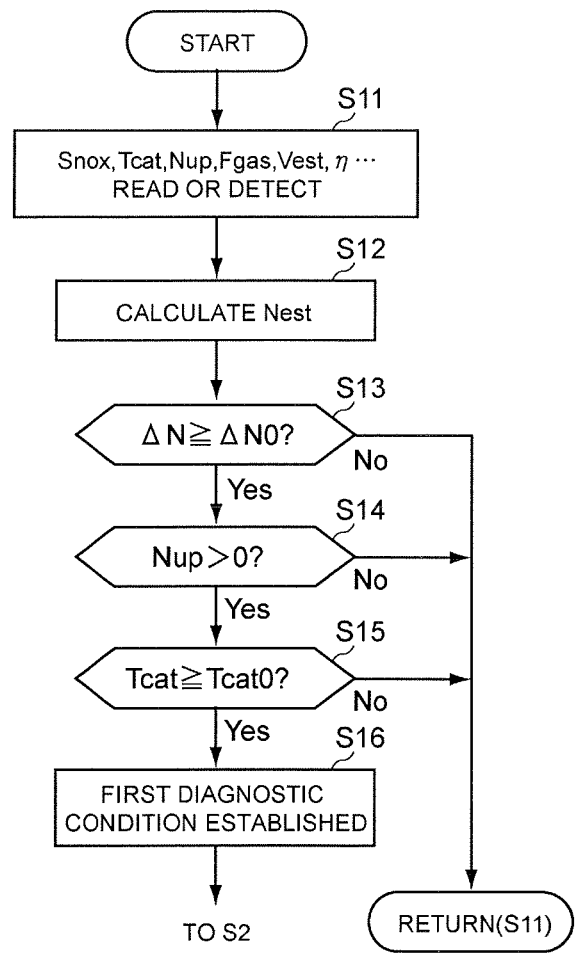
FIG. 8 is a flowchart showing one example of a method of detecting the establishment of a first diagnostic condition.

Next, one example of the abnormality diagnosing method performed by the control device 30 of the exhaust gas purification system 10 of the present embodiment will be specifically described on the basis of the flowcharts in FIG. 7 to FIG. 9.

First, in the flowchart in FIG. 7, the establishment of the start-of-diagnosis condition is detected in step S1. FIG. 8 shows one example of a flow for detecting the establishment of the first diagnostic condition. In step S11 in FIG. 8, the control device 30 reads or detects the detected gas concentration Snox obtained using the $NO_x$ sensor 15, the catalyst temperature Tcat obtained using the temperature sensors 26 and 27, the flow rate Fgas of the exhaust gas estimated from the operating state of the internal combustion engine 5, the upstream-side $NO_x$ concentration Nup, the current estimated adsorption quantity Vest of the ammonia in the selective reduction catalyst 13, the catalyst efficiency and so forth.

Next, in step S12, the control device 30 calculates the estimated downstream-side $NO_x$ concentration Nest on the basis of the information obtained in step S11. Next, in step S13, the control device 30 discriminates whether or not the value of the difference ΔN obtained by subtracting the estimated downstream-side $NO_x$ concentration Nest from the detected gas concentration Snox is equal to or greater than the first start-of-diagnosis threshold value ΔN0. When the difference ΔN is equal to or greater than the first start-of-diagnosis threshold value ΔN0, the control device 30 proceeds to step S14 where it discriminates whether the upstream-side $NO_x$ concentration Nup is not zero. When the upstream-side $NO_x$ concentration is not zero, the control device 30 further proceeds to step S15 where it discriminates whether or not the catalyst temperature Tcat is equal to or greater than the active temperature Tcat0.

When the difference ΔN is less than the first start-of-diagnosis threshold value ΔN0 in step S13 or when the upstream-side $NO_x$ concentration Nup is zero in step S14 or when the catalyst temperature Tcat is less than the active temperature Tcat0 in step S15, the control device 30 returns to step S11 because the first diagnostic condition is not established. On the other hand, when the conditions of step S13 to step S15 are all met, the control device 30 determines in step S16 that the first diagnostic condition has been established and proceeds to step S2 in FIG. 7.

In step S2, a drive control of the passageway area limiting device 20 is performed, and a control that limits the passage area of the exhaust gas is executed. As a result, the exhaust gas pressure P in the region where the selective reduction catalyst 13 is placed begins to rise.

Next, in step S3, a determination of whether the exhaust gas purification system 10 is in the ammonia outflow state or is in the $NO_x$ outflow state is performed. FIG. 9 shows one example of a flow for determining the abnormal state. In FIG. 9, first, like in steps S11 and S12 in FIG. 8, in step S21, the control device 30 reads or detects the detected gas concentration Snox, the catalyst temperature Tcat, the flow rate Fgas of the exhaust gas, the upstream-side $NO_x$ concentration Nup, the estimated adsorption quantity Vest of the ammonia, and the catalyst efficiency η, and in step S22, the control device 30 calculates the estimated downstream-side $NO_x$ concentration Nest.

Next, in step S23, the control device 30 discriminates whether a state in which the upstream-side $NO_x$ concentration Nup is not zero is ongoing. When the upstream-side $NO_x$ concentration Nup is zero, the control device 30 stops the diagnosis because it cannot accurately determine which of the ammonia outflow state and the $NO_x$ outflow state the exhaust gas purification system 10 is in. On the other hand, when a state in which the upstream-side $NO_x$ concentration Nup is not zero is ongoing, the control device 30 proceeds to step S24. In step S24, the control device 30 discriminates whether or not the predetermined amount of time has elapsed since the establishment of the first diagnostic condition. When the predetermined amount of time has not elapsed, the control device 30 returns to step S21. When the predetermined amount of time has elapsed, the control device 30 proceeds to step S25.

In step S25, the control device 30 discriminates whether or not the difference ΔN obtained by subtracting the estimated downstream-side $NO_x$ concentration Nest from the detected gas concentration Snox is less than the first determination-use threshold value ΔN1. When the difference ΔN is less than the first determination-use threshold value ΔN1, the control device 30 determines in step S26 that the exhaust gas purification system 10 is in the ammonia outflow state. When the difference ΔN is equal to or greater than the first determination-use threshold value ΔN1, the control device 30 determines in step S27 that the exhaust gas purification system 10 is in the $NO_x$ outflow state. Thereafter, the control device 30 proceeds to step S28. In step S28, to which the control device 30 proceeds when it finishes determining the abnormal state, the passage area of the exhaust gas is returned to normal by the passageway area limiting device 20.

In this way, by implementing the determination of the abnormal state occurring in the exhaust gas purification system 10, the control device 30 can determine whether the excessive rise in the detected gas concentration Snox is caused by outflow of the ammonia or by outflow of the $NO_x$ without having to significantly raise the downstream-side ammonia concentration or the downstream-side $NO_x$ concentration. Further, if the control device 30 can discriminate whether the detected gas concentration Snox is the downstream-side ammonia concentration or the downstream-side $NO_x$ concentration, the feedback control of the target injection quantity Qudtgt using the detected gas concentration Snox is accurately performed, and tremendous outflow of the ammonia or the $NO_x$ to the downstream side of the selective reduction catalyst 13 is reduced.

Second Embodiment

An exhaust gas purification system abnormality diagnosing device and abnormality diagnosing method and an exhaust gas purification system pertaining to a second embodiment of the present invention determines which abnormal state of an abnormality in the $NO_x$ sensor or the ammonia outflow state is occurring. The overall configuration of the exhaust gas purification system of the present embodiment is the same as that of the exhaust gas purification system of the first embodiment, but the configuration of the control device and the control content implemented by the control device differ from those of the control device of the first embodiment. The exhaust gas purification system abnormality diagnosing device and abnormality diagnosing method of the present embodiment will be described below with reference to FIG. 10 centering on points that differ from the first embodiment.

1. Control Device

FIG. 10 shows the configuration of the control device 30 serving as the abnormality determining device of the present embodiment. This control device 30 is equipped with a sensor value detecting means 81, a reducing agent injection controlling means 82, an upstream-side $NO_x$ concentration computing means 83, a diagnostic condition detecting means 84, a limiting device controlling means 85, and a determining means 86 as its main components. Of these, the reducing agent injection controlling means 82, the upstream-side $NO_x$ concentration computing means 83, and the limiting device controlling means 85 have the same configurations as those of the reducing agent injection controlling means 32, the upstream-side $NO_x$ concentration computing means 33, and the limiting device controlling means 36, respectively, of the control device 30 of the first embodiment.

(1) Sensor Value Detecting Means

The sensor value detecting means 81 is configured to read the sensor information of the $NO_x$ sensor 15 to detect the gas concentration Snox (hereinafter this gas concentration will be called "the detected gas concentration"). As has already been described, this detected gas concentration Snox is basically recognized as the downstream-side $NO_x$ concentration, but sometimes it actually represents the ammonia concentration.

Further, the sensor value detecting means 81 of the present embodiment is configured to correct the detected gas concentration Snox to the minus side when, as a result of a determination by the determining means 86, it has been determined that the exhaust gas purification system 10 is in an abnormal state of the $NO_x$ sensor 15 in which the detected gas concentration Snox that is outputted is larger than its actual value.

(2) Diagnostic Condition Detecting Means

The control device 30 of the present embodiment is configured such that it can determine whether the current exhaust gas purification system 10 is in a state in which the ammonia easily flows out to the downstream side of the selective reduction catalyst 13 or is in an abnormal state of the $NO_x$ sensor 15. For that reason, the diagnostic condition detecting means 84 is configured to detect a second diagnostic condition, which includes at least the detected gas concentration Snox obtained using the $NO_x$ sensor 15 being equal to or greater than a predetermined second start-of-diagnosis threshold value Snox0 and the upstream-side $NO_x$ concentration Nup being zero, and to send a start-of-diagnosis signal to the limiting device controlling means 85 and the determining means 86.

The detected gas concentration Snox being equal to or greater than the second start-of-diagnosis threshold value Snox0 means that the exhaust gas purification system 10 is in a state in which the value of the detected gas concentration Snox on which control is originally performed so as to become equal to or less than a predetermined value is excessively rising. The second start-of-diagnosis threshold value Snox0 can be appropriately set in consideration of the value of an allowed downstream-side $NO_x$ concentration Nmax or a downstream-side ammonia concentration Amax.

Further, the upstream-side $NO_x$ concentration Nup being zero means that fuel injection is stopped in the internal combustion engine 5 and that the exhaust gas purification system 10 is in a state in which $NO_x$ is not included in the exhaust gas. However, the condition may also be different as long as that state can be detected. For example, the fuel injection quantity of the internal combustion engine 5 or the injection quantity of the reducing agent being zero can also be used as a condition.

The abnormality diagnosis in the present embodiment is executed at a time when fuel injection is stopped, and basically the catalyst temperature Tcat drops, so in contrast to the first embodiment, the catalyst temperature Tcat being equal to or greater than the active temperature is not included in the second diagnostic condition.

(3) Determining Means

The determining means 86 is a portion that determines the abnormal state of the exhaust gas purification system 10 on the basis of the change in the detected gas concentration Snox that is detected after the determining means 86 has received the start-of-diagnosis signal from the diagnostic condition detecting means 84. In the present embodiment, the determining means 86 is configured to compare the detected gas concentration Snox, which is detected after the determining means 86 has received the start-of-diagnosis signal, with a second determination-use threshold value Snox1. When the detected gas concentration Snox is less than the second determination-use threshold value Snox1, the determining means 86 determines that the exhaust gas purification system 10 is in a state in which the ammonia is outflowing to the downstream side of the selective reduction catalyst 13. When the detected gas concentration Snox is equal to or greater than the second determination-use threshold value Snox1, the determining means 86 determines that the exhaust gas purification system 10 is in an abnormal state in which the $NO_x$ sensor 15 outputs a value that is larger than the actual concentration.

Figure 11A:
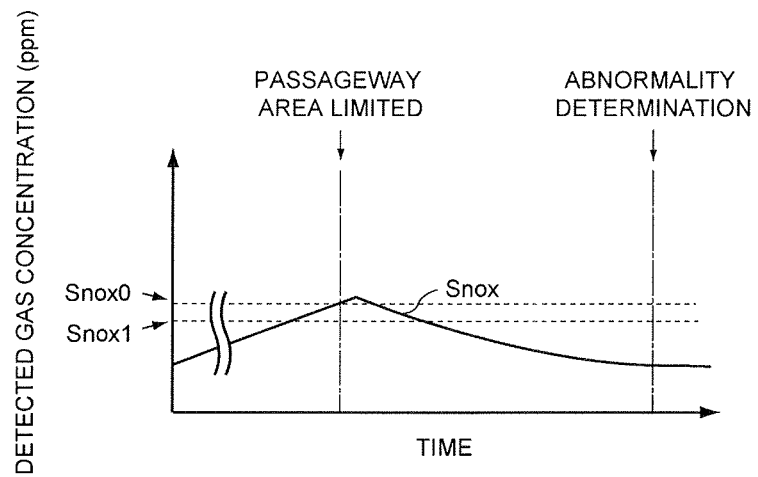
FIGS. 11A and 11B are diagrams showing changes in a detected gas concentration before and after limiting a passageway area in each of an ammonia outflow state and an abnormal state of a $NO_x$ sensor.
Figure 11B:
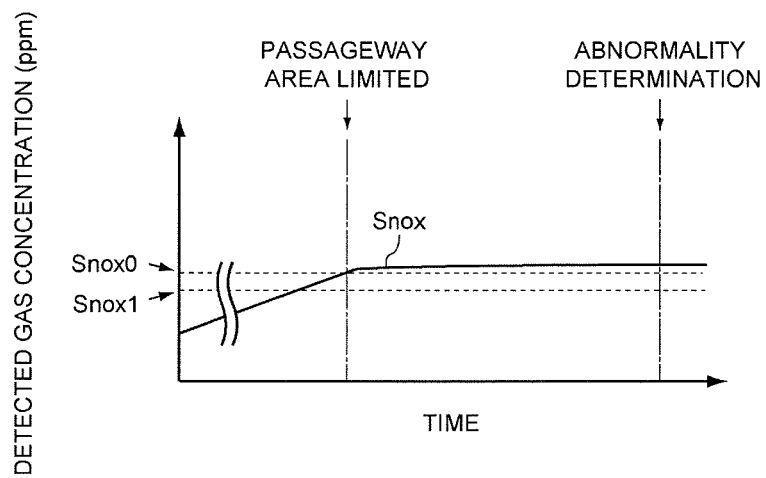

FIGS. 11A and 11B show changes in the detected gas concentration Snox when the passageway area has been limited in each of a state in which the ammonia is outflowing and a state in which the $NO_x$ sensor 15 is abnormal.

FIG. 11A shows the change in the detected gas concentration Snox in a state in which at least the ammonia is outflowing. That is, the detected gas concentration Snox mainly represents the downstream-side ammonia concentration. In this case, as the passageway area is limited and the quantity Vmax of the ammonia adsorbable by the selective reduction catalyst 13 increases, the adsorbable quantity Vmax continues to increase as a result of the catalyst temperature Teat dropping because of the drop in the exhaust gas temperature in the non-injecting state of the internal combustion engine 5, so the quantity of the ammonia outflowing to the downstream side of the selective reduction catalyst 13 continues to decrease.

FIG. 11B shows the change in the sensor value in a state in which outflow of the ammonia is not occurring—that is, a state in which the $NO_x$ sensor 15 is abnormal. In this case, even if the passageway area is limited and the quantity Vmax of the ammonia adsorbable by the selective reduction catalyst 13 increases, the detected gas concentration Snox virtually does not change.

The downstream-side ammonia concentration changes relatively gently, so in the present embodiment also, the determining means 86 is configured to determine the abnormal state by comparing, with the second determination-use threshold value Snox1, the detected gas concentration Snox after a predetermined amount of time has elapsed since receiving the start-of-diagnosis signal. Or, the determining means 86 may also be configured to determine that the exhaust gas purification system 10 is in a state in which at least the ammonia is outflowing when the detected gas concentration Snox has become less than the second determination-use threshold value Snox1 until the predetermined amount of time elapses since receiving the start-of-diagnosis signal.

The second determination-use threshold value Snox1 is at least set to a value equal to or less than the second start-of-diagnosis threshold value Snox0 serving as the second diagnostic condition. If the exhaust gas purification system 10 is in a state in which there is no outflow of the ammonia, the detected gas concentration Snox should be maintained at the same value, so the second determination-use threshold value Snox1 may also be the same value as the second start-of-diagnosis threshold value Snox0. However, because there is the fear that the detected gas concentration Snox will fluctuate depending on changes in the ambient temperature and so forth, it is preferable for the second determination-use threshold value Snox1 to be set to a smaller value than the second start-of-diagnosis threshold value Snox0.

When the determining means 86 finishes determining the abnormal state in this way, it sends an end-of-determination signal to the limiting device controlling means 85 and transmits information of the determination result of the abnormal state to the sensor value detecting means 81 and the reducing agent injection controlling means 82.

2. Abnormality Diagnosing Method

Figure 12:
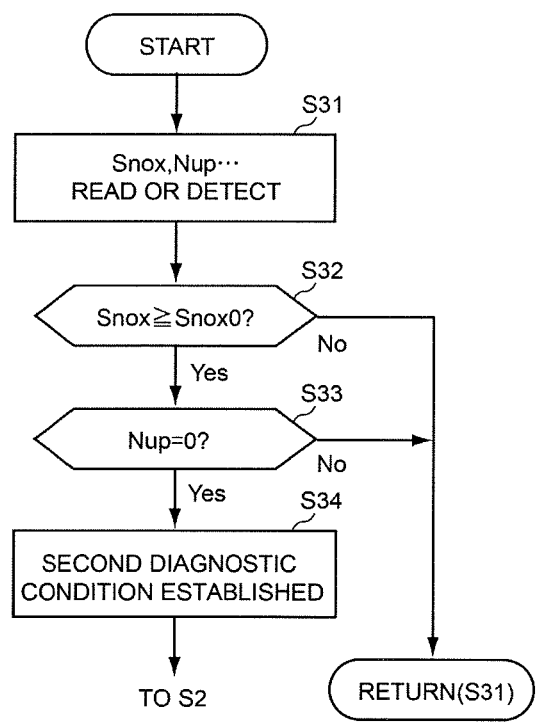
FIG. 12 is a flowchart showing one example of a method of detecting the establishment of a second diagnostic condition.
Figure 13:
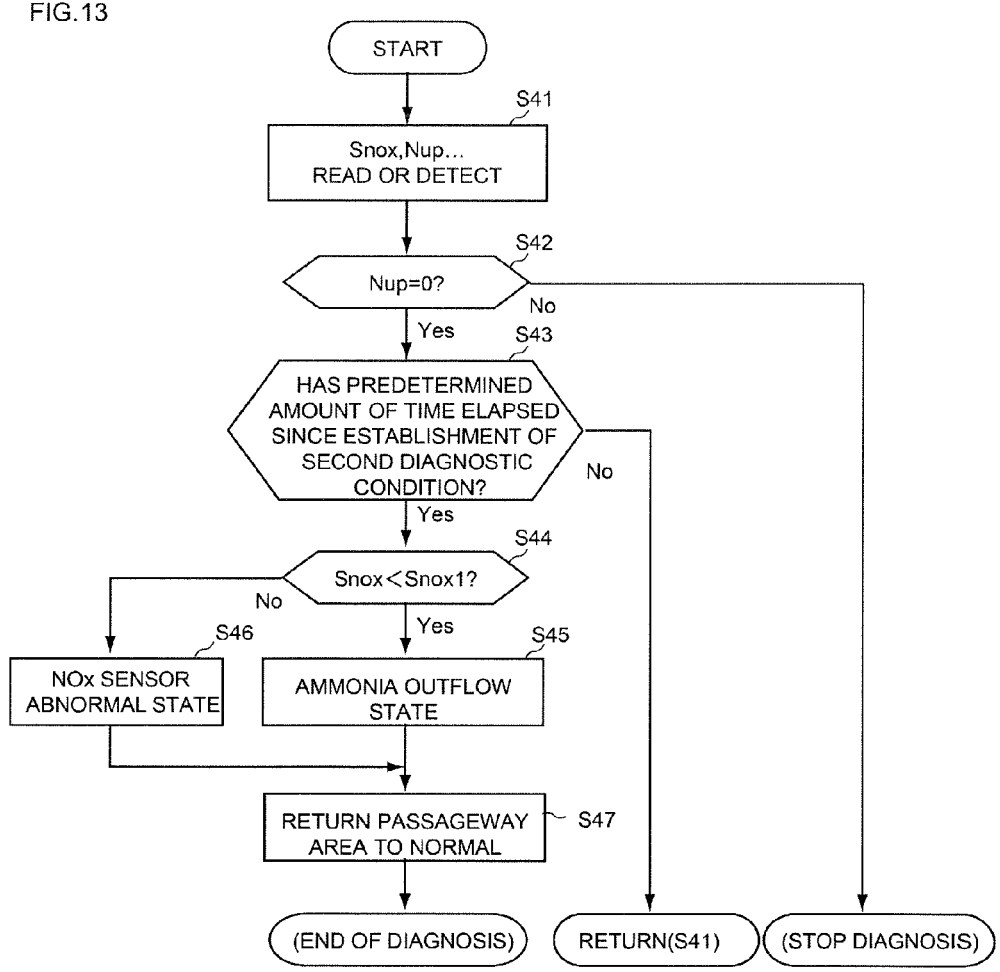
FIG. 13 is a flowchart showing one example of a method of determining outflow of ammonia or an abnormality in the $NO_x$ sensor.

Next, one example of the abnormality diagnosing method performed by the control device 30 of the present embodiment will be specifically described on the basis of the flowcharts in FIG. 7, FIG. 12, and FIG. 13.

First, in the flowchart in FIG. 7, the establishment of the start-of-diagnosis condition is detected in step S1. FIG. 12 shows one example of a flow for detecting the establishment of the second diagnostic condition. In step S31 in FIG. 12, the control device 30 reads or detects the detected gas concentration Snox obtained using the $NO_x$ sensor 15, the upstream-side $NO_x$ concentration Nup estimated from the operating state of the internal combustion engine 5, and so forth.

Next, in step S32, the control device 30 discriminates whether or not the detected gas concentration Snox is equal to or greater than the second start-of-diagnosis threshold value Snox0. When the detected gas concentration Snox is equal to or greater than the second start-of-diagnosis threshold value Snox0, the control device 30 proceeds to step S33 where it discriminates whether the upstream-side $NO_x$ concentration Nup is zero.

When the detected gas concentration Snox is less than the second start-of-diagnosis threshold value Snox0 in step S32 or when the upstream-side $NO_x$ concentration Nup is not zero in step S33, the control device 30 returns to step S31 because the second diagnostic condition is not established. On the other hand, when the conditions of step S32 and step S33 are both met, the control device 30 determines in step S34 that the second diagnostic condition has been established and proceeds to step S2 in FIG. 7.

In step S2, a drive control of the passageway area limiting device 20 is performed, and a control that limits the passage area of the exhaust gas is executed. As a result, the exhaust gas pressure P in the region where the selective reduction catalyst 13 is placed begins to rise.

Next, in step S3, a determination of whether the exhaust gas purification system 10 is in the at least ammonia outflow state or is in the abnormal state of the $NO_x$ sensor 15 is performed. FIG. 13 shows one example of a flow for determining the abnormal state. In FIG. 13, first, like in step S31 in FIG. 12, in step S41, the control device 30 reads or detects the detected gas concentration Snox and the upstream-side $NO_x$ concentration Nup and so forth.

Next, in step S42, the control device 30 discriminates whether a state in which the upstream-side $NO_x$ concentration Nup is zero is ongoing. When the upstream-side $NO_x$ concentration Nup is not zero, the control device 30 stops the diagnosis because it cannot accurately determine which of the ammonia outflow state and the abnormal state of the $NO_x$ sensor 15 the exhaust gas purification system 10 is in. On the other hand, when a state in which the upstream-side $NO_x$ concentration Nup is zero is ongoing, the control device 30 proceeds to step S43. In step S43, the control device 30 discriminates whether or not the predetermined amount of time has elapsed since the establishment of the second diagnostic condition. When the predetermined amount of time has not elapsed, the control device 30 returns to step S41. When the predetermined amount of time has elapsed, the control device 30 proceeds to step S44.

In step S44, the control device 30 discriminates whether or not the detected gas concentration Snox is less than the second determination-use threshold value Snox1. When the detected gas concentration Snox is less than the second determination-use threshold value Snox1, the control device 30 determines in step S45 that the exhaust gas purification system 10 is in the ammonia outflow state. When the detected gas concentration Snox is equal to or greater than the second determination-use threshold value Snox1, the control device 30 determines in step S46 that the $NO_x$ sensor 15 is in an abnormal state. Thereafter, the control device 30 proceeds to step S47.

In step S47, to which the control device 30 proceeds when it finishes determining the abnormal state, the passage area of the exhaust gas is returned to normal by the passageway area limiting device 20. In step S3, when it has been determined that the NO$_x$ sensor 15 is in an abnormal state, setting of a correction factor β used to correct the detected gas concentration Snox is performed.

In this way, by implementing the determination of the abnormal state occurring in the exhaust gas purification system 10, the control device 30 can determine whether the excessive rise in the detected gas concentration Snox is caused by an outflow of the ammonia or by an abnormality in the NO$_x$ sensor 15 without having to significantly raise the downstream-side ammonia concentration. Further, if the control device 30 can discriminate that the detected gas concentration Snox is the downstream-side ammonia concentration, the feedback control of the target injection quantity Qudtgt using the detected gas concentration Snox is accurately performed. On the other hand, if the control device 30 can discriminate an abnormal state of the NO$_x$ sensor 15, correction of the detected gas concentration Snox is performed, and the feedback control of the target injection quantity Qudtgt using the detected gas concentration Snox is accurately performed. As a result, a tremendous outflow of the ammonia or the NO$_x$ to the downstream side of the selective reduction catalyst 13 is reduced.

It is preferable to configure the control device 30 such that the abnormality diagnosis of the first embodiment and the abnormality diagnosis of the second embodiment which have been heretofore described are both executed. That is, by implementing the two abnormality diagnoses while changing the diagnosis content between the state in which the upstream-side NO$_x$ concentration Nup is zero and the state in which the upstream-side NO$_x$ concentration Nup is not zero, it becomes possible to accurately determine whether the exhaust gas purification system is in the NO$_x$ outflow state or the ammonia outflow state while taking into consideration whether or not there is an abnormality in the NO$_x$ sensor 15.

What is claimed is:

1. An exhaust gas purification system equipped with a selective reduction catalyst that is capable of adsorbing ammonia and is for using the ammonia to reduce NOx in exhaust gas emitted from an internal combustion engine, and a specified gas concentration sensor that is disposed on a downstream side of the selective reduction catalyst and responds at least to the NOx and the ammonia, the exhaust gas purification system comprising:
    a passageway area limiting device that is disposed in the exhaust gas passageway on the downstream side of the selective reduction catalyst;
    a limiting device controlling means which, when a gas concentration detected by the specified gas concentration sensor has become equal to or greater than a predetermined start-of-diagnosis threshold value or when a difference obtained by subtracting from the gas concentration an estimated NOx concentration on the downstream side of the selective reduction catalyst obtained by computation has become equal to or greater than a predetermined start-of-diagnosis threshold value, increases the quantity of the ammonia capable of being adsorbed by the selective reduction catalyst by raising the pressure inside the exhaust gas passageway with the passageway area limiting device;
    a determining means that determines the abnormal state in which abnormal outflows of ammonia or NOx are occurring on the basis of the gas concentration detected downstream of the selective reduction catalyst or the difference obtained by subtracting from the gas concentration detected downstream of the selective reduction catalyst and an estimated NOx concentration on the downstream side of the selective reduction catalyst obtained by computation after the pressure inside the exhaust gas passageway has been raised; and
    a reducing agent supply device that supplies a reducing agent derived from the ammonia to the inside of an exhaust gas passageway on an upstream side of the selective reduction catalyst, wherein an operation of the reducing agent supply device is modified based on the determination of the determining means.

2. An exhaust gas purification system including an abnormality diagnosing device for diagnosing an abnormality occurring in an exhaust gas purification system equipped with a selective reduction catalyst that is capable of adsorbing ammonia and is for using the ammonia to reduce NOx in exhaust gas emitted from an internal combustion engine, the exhaust gas purification system comprising:
    a specified gas concentration sensor that is disposed on a downstream side of the selective reduction catalyst and responds at least to the NOx and the ammonia;
    a sensor value detecting means that reads a sensor signal of the specified gas concentration sensor to detect a gas concentration;
    a limiting device controlling means which, when the gas concentration has become equal to or greater than a predetermined start-of-diagnosis threshold value or when a difference obtained by subtracting from the gas concentration an estimated NO$_x$ concentration on the downstream side of the selective reduction catalyst obtained by computation has become equal to or greater than a predetermined start-of-diagnosis threshold value, increases the quantity of the ammonia capable of being adsorbed by the selective reduction catalyst by raising the pressure inside the exhaust gas passageway with a passageway area limiting device disposed on the downstream side of the selective reduction catalyst; and
    a determining means that determines the abnormal state in which abnormal outflows of ammonia or NOx are occurring on the basis of the gas concentration detected downstream of the selective reduction catalyst or the difference obtained by subtracting from the gas concentration detected downstream of the selective reduction catalyst and an estimated NOx concentration on the downstream side of the selective reduction catalyst obtained by computation after the pressure inside the exhaust gas passageway has been raised; and
    a reducing agent supply device that supplies a reducing agent derived from the ammonia to the inside of an exhaust gas passageway on an upstream side of the selective reduction catalyst, wherein an operation of the reducing agent supply device is modified based on the determination of the determining means.

3. The exhaust gas purification system abnormality diagnosing device according to claim 2, wherein the determining means determines that the exhaust gas purification system is in a state in which there is outflow of the ammonia when the gas concentration or the difference has decreased after the pressure inside the exhaust gas passageway has been raised.

4. The exhaust gas purification system abnormality diagnosing device according to claim 2, wherein the abnormality diagnosing device further comprises a first diagnostic condition detecting means that detects the establishment of a first diagnostic condition where the difference is equal to or greater than the start-of-diagnosis threshold value and the internal combustion engine is in a fuel-injecting state, the limiting device controlling means raises the pressure inside the exhaust gas passageway when the first diagnostic condition has been established, and the determining means determines that the exhaust gas purification system is in a state in which there is outflow of the ammonia when the difference after the pressure inside the exhaust gas passageway has been raised is less than a predetermined first determination-use threshold value and determines that the exhaust gas purification system is in a state in which there is a drop in the NOx purification efficiency when the difference is equal to or greater than the first determination-use threshold value.

5. The exhaust gas purification system abnormality diagnosing device according to claim 2, wherein the abnormality diagnosing device further comprises a second diagnostic condition detecting means that detects the establishment of a second diagnostic condition where the gas concentration is equal to or greater than the start-of-diagnosis threshold value and the internal combustion engine is in a non-fuel-injecting state, the limiting device controlling means raises the pressure inside the exhaust gas passageway when the second diagnostic condition has been established, and the determining means determines that the exhaust gas purification system is in a state in which there is outflow of the ammonia when the gas concentration after the pressure inside the exhaust gas passageway has been raised is less than a predetermined second determination-use threshold value and determines that the exhaust gas purification system is in a state in which there is an abnormality in the specified gas concentration sensor when the gas concentration is equal to or greater than the second determination-use threshold value.

6. The exhaust gas purification system abnormality diagnosing device according to claim 4, wherein the determining means compares, with the first determination-use threshold value or the second determination-use threshold value, the gas concentration or the difference after a predetermined amount of time elapses since the pressure inside the exhaust gas passageway has been raised.

7. The exhaust gas purification system abnormality diagnosing device according to claim 4, wherein the first diagnostic condition includes as a condition the selective reduction catalyst being in an active state.

8. An exhaust gas purification system abnormality diagnosing method for diagnosing an abnormality occurring in an exhaust gas purification system equipped with a selective reduction catalyst that is capable of adsorbing ammonia and is for using the ammonia to reduce NOx in exhaust gas emitted from an internal combustion engine, a reducing agent supply device that supplies a reducing agent derived from the ammonia to the inside of an exhaust gas passageway on an upstream side of the selective reduction catalyst, and a specified gas concentration sensor that is disposed on a downstream side of the selective reduction catalyst and responds at least to the NOx and the ammonia, the exhaust gas purification system abnormality diagnosing method comprising:

raising the pressure inside the exhaust gas passageway with a passageway area limiting device disposed on the downstream side of the selective reduction catalyst to increase the quantity of the ammonia capable of being adsorbed by the selective reduction catalyst when a gas concentration detected by the specified gas concentration sensor has become equal to or greater than a predetermined start-of-diagnosis threshold value or when a difference obtained by subtracting from the gas concentration an estimated NOx concentration on the downstream side of the selective reduction catalyst obtained by computation has become equal to or greater than a predetermined start-of-diagnosis threshold value, determining the abnormal state in which abnormal outflows of ammonia or NOx are occurring on the basis of the gas concentration detected downstream of the selective reduction catalyst or the difference obtained by subtracting from the gas concentration detected downstream of the selective reduction catalyst and an estimated NOx concentration on the downstream side of the selective reduction catalyst obtained by computation, and operating the reducing agent supply device based on the determination of the step of determining.

* * * * *